G. B. COLLIER.
GOGGLES.
APPLICATION FILED MAY 25, 1911.
1,080,893.
Patented Dec. 9, 1913.
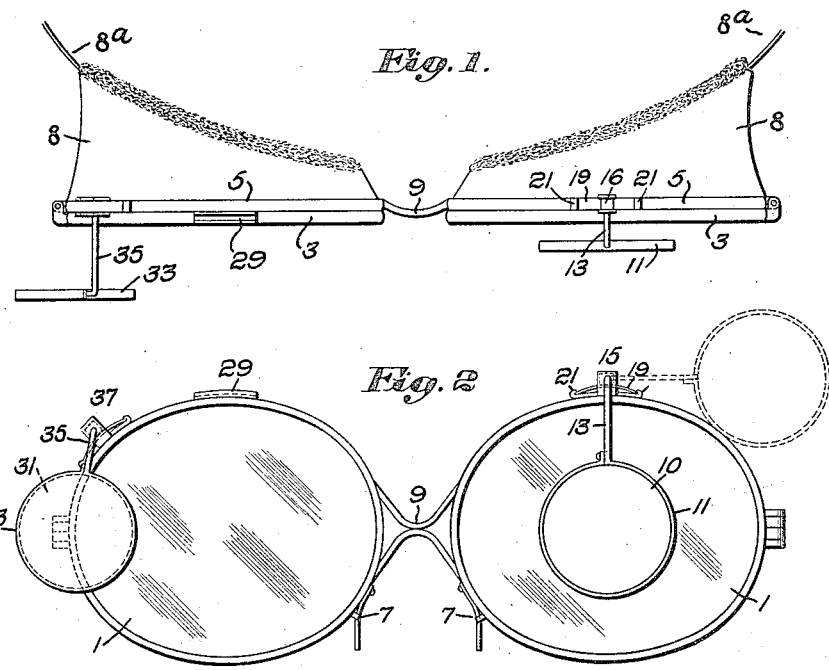

UNITED STATES PATENT OFFICE.

GUY B. COLLIER, OF KINDERHOOK, NEW YORK.

GOGGLES.

1,080,893.  Specification of Letters Patent.  Patented Dec. 9, 1913.

Application filed May 25, 1911. Serial No. 629,347.

*To all whom it may concern:*

Be it known that I, GUY B. COLLIER, a citizen of the United States, and a resident of Kinderhook, in the county of Columbia and State of New York, have invented an Improvement in Goggles, of which the following description, in connection with the accompanying drawings, is a specification, like letters on the drawings representing like parts.

This invention relates to automobile goggles and the like, and devices adapted to be used in connection therewith.

The character of the invention may be best understood by reference to the following description of an illustrative embodiment thereof shown in the accompanying drawings, wherein:

Figure 1 is a top view of goggles and devices adapted to be used in connection therewith embodying the invention; Fig. 2 is a front view of said goggles and devices; Fig. 3, on an enlarged scale, is a front elevation of parts shown in Fig. 2; Fig. 4 is a section taken on line 4—4 of Fig. 3; and Figs. 5, 6 and 7 are details to be referred to.

The illustrative goggles shown herein as embodying the invention comprise transparent means, shown as glasses or lenses 1 (Fig. 2) mounted in rims 3 hinged at their ends to fixed rims 5 and held in closed position by catches 7. In the event of the clouding of the glasses they may be readily swung out from said fixed rims and permit the wearer to see clearly. To provide a closure for the space between the glasses and the face of the wearer suitable usual collapsible or other eye cups 8 may be provided. The edges of the eye cups may be lined with chenille or other suitable cushion material. Suitable straps 8ª are provided for holding the goggles on the head of the wearer. The fixed rims 5 may be connected by a bridge piece 9 of metal or other suitable material which preferably is sufficiently flexible to permit said rims to be bent bodily back to conform to the face of the wearer.

To avoid the discomfort caused by the glare of powerful lights of approaching automobiles a shutter, or smoked or other glass may be positioned in front of either or both eyes of the wearer of the goggles, as desired. In practice it will probably be sufficient to use but one shutter which, preferably, would be provided for the left eye of the wearer, that being nearer to passing vehicles. Herein is shown a smoked glass 10 mounted in a rim 11 carried by an elbow stem 13. This stem preferably is supported directly on the fixed rim carrying the glasses. For this purpose the free end of the stem is inserted in registering bearing apertures in ears 14 of a bracket 15 (Figs. 3 and 4) which may be soldered or otherwise secured to said rim. To hold the stem in its positions of adjustment it may have a block 16 on the portion thereof between the ears of said bracket, flat faces 17 thereof being adapted for engagement with the back of an arched leaf spring 19 having its ends resting on the base of said bracket and retained thereon conveniently by upturned ends 21 of said bracket. It will be understood that other forms and types of springs might be used. The bracket may be conveniently formed from a cruciform blank 23 (Fig. 5), opposed wings thereof being bent upwardly and apertured to provide the bearing ears for the stem, and other opposed wings thereof being bent up adjacent their ends to provide limits for the spring.

By the above described construction the stem will be effectively retained in its positions of rotative adjustment by the yielding engagement of the spring with one or another of the flat faces of said block. These flat faces are so arranged relatively to the shutter that when the latter is in its vertical or operative position in front of the eye of the wearer one of said flat faces will be in engagement with the spring and the shutter will automatically be held in its depending position. When it is desired to adjust the shutter away from the eye it is merely necessary to swing said shutter to a horizontal inoperative position such as shown in dotted lines in Fig. 2 where it will automatically be retained by the engagement of another of said flat faces with said spring. Similarly the shutter may be held in other positions as desired. While herein said block 16 is shown as having four flat faces, it will be understood that it might have any number of faces, according to the positions to which it is desired to adjust the shutter.

In some instances it may be desired to detachably mount the shutters on the rims.

To this end a shutter bracket similar to that described may be provided having an elongated end wing 27 (Figs. 6 and 7) which may be dovetailed in section and adapted to slide into a dovetail groove of a base block 29 which may be soldered or otherwise mounted either on the fixed or swing rim, said block being shown herein on one of the swing rims. By this construction the bracket proper may be readily connected to or disconnected from the rim as desired. It is very desirable to be able to see objects at the rear of the automobile without turning the head. For this purpose there may be provided a small mirror shutter 31 mounted in a frame 33 carried by an elbow stem 35 adjustably mounted in a bracket 37 similar to that previously described for the smoked glass shutter, said bracket being mounted preferably on one of the fixed rims 5. By this construction the mirror may be adjusted to and from operative and inoperative positions according to whether or not it is desired to see objects at the rear of the wearer. In some instances to effect a proper visualization of objects at the rear it may be necessary to give the stem of the mirror a rotative adjustment. This may be accomplished in a variety of ways. Herein the stem 35 is made of ductile metal such as will permit the twisting of the stem without injury thereto. When the mirror has once been adjusted to the proper angle for the wearer, it would probably not need further adjustment.

The elbow stem of the mirror is of a length sufficient to support said mirror a substantial distance in front of the glass adjacent thereto. As a result the wearer may look through said glass at said mirror and readily visualize objects at the rear of the wearer. Also the mirror may be swung to various positions of adjustment in the plane of the mirror and its stem twisted to change the angle of the mirror to said glass, all without interference with said glass and without obstruction of the view from the eye cups or glass.

It will be understood that the smoked glass shutter and mirror shutter may be mounted on either the right or the left eye glass rim, and that they may be mounted on either the fixed or swing rims and at any convenient points on the peripheries of the rims. Also the glasses 1, instead of being mounted in swing rims may be mounted directly in fixed rims, if desired.

By the invention the shutters are securely mounted directly on the rims of the goggles and therefore will always be maintained in proper relation to the glasses without liability of being disturbed by, or without interfering with distortion or collapsing of the eye cups.

The devices connecting the shutters to the rims are small, simple and inconspicuous, cheap to manufacture and effective in operation.

It is not indispensable that all of the features of the invention be used conjointly since they may be used separately to advantage.

Having described a preferred embodiment of the invention without limiting the invention thereto, what I claim as new and desire to secure by Letters Patent is:

1. In automobile goggles the combination of rims; transparent means therein; a shutter; and means adjustably to secure said shutter on one of said rims, said means having provision for automatically holding said shutter in operative and inoperative predetermined fixed positions.

2. In automobile goggles the combination of transparent means; a shutter; and means adjustably to connect said shutter to said transparent means including provision for yieldingly holding said shutter in different predetermined fixed positions.

3. In automobile goggles the combination of transparent means; a shutter; and means to connect said parts including means formed to present flat faces and a spring for engagement with one or another of said faces for securing said shutter in different predetermined positions.

4. In automobile goggles the combination of transparent means; a shutter; and means adjustably to connect the same comprising a bracket, a stem for said shutter fulcrumed in said bracket and having flat faces, and a spring interposed between said flat faces and the base of said bracket for holding said shutter in different positions.

5. In automobile goggles the combination of glass carrying means; a mirror; and means for adjustably supporting said mirror a substantial distance in front of the plane of one of the glasses of the goggles to permit the wearer to look through said glass at said mirror and visualize objects at the rear of the wearer without interference from said glass carrying means; said mirror supporting means having provision for automatically holding the mirror in operative and inoperative fixed, predetermined positions.

6. In automobile goggles the combination of glass carrying means; a mirror; and means for adjustably supporting said mirror a substantial distance in front of the plane of one of the glasses of the goggles to permit the wearer to look through said glass at said mirror and visualize objects at the rear of the wearer without interference from said glass carrying means, said mirror supporting means having provision permitting the mirror to be adjusted to different positions while remaining in the same plane.

7. In automobile goggles the combination of transparent means; a shutter; and means detachably to secure the latter to the former and having provision permitting the removal of the shutter without disturbing the position of the goggles on the wearer.

8. In automobile goggles the combination of rims; transparent means therein; a shutter; and means to secure the latter to one of said rims comprising a bracket detachably mounted on said rim and having provision permitting its removal from said rim without disturbing the position of the goggles on the wearer.

9. In automobile goggles the combination of transparent means; a shutter; and means detachably to connect the same comprising a grooved member and means carrying said shutter formed to slide in said groove.

10. In automobile goggles the combination of glass supporting rims; a shutter; and means detachably to connect said shutter to one of said rims including a block on said rim having a dovetailed groove, a bracket formed to fit in said groove and a stem for said shutter adjustably mounted in said bracket.

11. In automobile goggles the combination of eye cups 8, glass carrying rims 3, 5 connected thereto, shutters 10, 31, and means adjustably to connect the latter to said rims.

12. In automobile goggles the combination of transparent members; a shutter; and means adjustably to connect said shutter thereto, said means having provision for automatically holding said shutter in operative and inoperative predetermined fixed position.

In testimony whereof, I have signed my name to this specification in the presence of two subscribing witnesses.

GUY B. COLLIER.

Witnesses:
HENRY T. WILLIAMS,
ROBERT H. KAMMLER.

---

Copies of this patent may be obtained for five cents each, by addressing the "Commissioner of Patents, Washington, D. C."